Oct. 25, 1927.

J. B. RICHARD

JAR HOLDER

Filed Oct. 27, 1926

1,646,661

Inventor
Joseph B Richard,

By Clarence A O'Brien
Attorney

Patented Oct. 25, 1927.

1,646,661

UNITED STATES PATENT OFFICE.

JOSEPH B. RICHARD, OF PHILADELPHIA, PENNSYLVANIA.

JAR HOLDER.

Application filed October 27, 1926. Serial No. 144,488.

This invention relates to new and useful improvements in jar holders and has for its primary object to provide a holder that may be employed in conjunction with jars of various sizes for use in the removal of the jar lids, the same being of such a nature that when the handle member thereof is held in one hand, and the other hand employed for releasing the lid, the jar gripping member will be automatically tightly bound upon the jar so as to positively prevent the slippage of the same.

A further and important object is to provide a jar holder of this character wherein the free end of the jar gripping member may be adjustably and tightly secured to the handle member so as to prevent slippage of said end with respect to the handle member when the device is in use.

Other objects will become apparent as the nature of the invention is better understood, the same comprising the novel form, combination, and arrangement of parts hereinafter more fully described, shown in the accompanying drawing and claimed.

In the drawing wherein like reference characters indicate corresponding parts throughout the several views.

Figure 1:
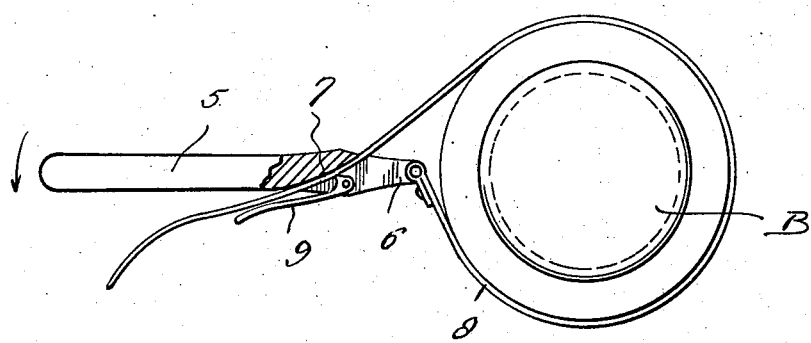
Figure 1 is a view partly in top plan and partly in cross section of a jar holder constructed in accordance with the present invention, the same being disclosed as actually in use.
Figure 2:
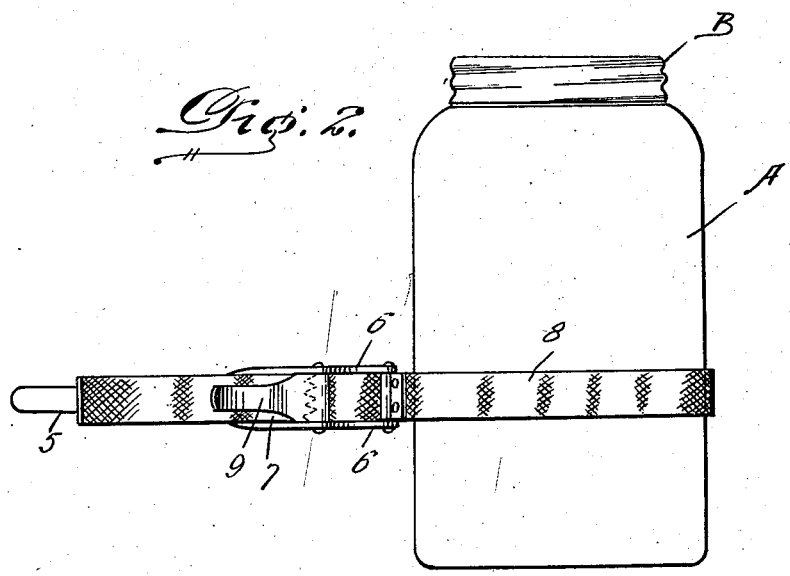
Figure 2 is a side elevation thereof.
Figure 3:
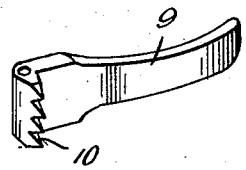
Figure 3 is a somewhat enlarged perspective of a clamp lever pivotally associated with the handle member and adapted for the purpose of securing the jar gripping member to said handle.

Now having particular reference to the drawing, my novel jar holder consists of a handle lever 5, the inner end of which is longitudinally slotted as at 6, the rear wall of the slot being inclined as at 7. Pivoted within the slot 6 at the extreme end of the handle 5 is a jar gripping member 8 in the form of a length of heavy fabric, leather or the like, that is adapted to be engaged around the jar A, as indicated in Figures 1 and 2. After the said gripping member has been arranged around the jar, the free end thereof is passed through the slot 6 of the handle lever 5 as indicated in Figure 1. Pivoted within the slot directly forwardly of the rear wall thereof is a gripping lever 9, the inner end thereof being formed with a vertical row of spaced biting teeth 10, so formed with respect to the lever 9 that when the same is swung inwardly toward the handle lever 5, the teeth will wedge the jar gripping member against the back wall of the handle lever slot 5 so as to prevent further movement of the jar gripping member within said slot.

Obviously, after the holder has been associated with the jar as indicated in Figures 1 and 2, the handle lever 5 is grasped by one hand, while the other hand is engaged upon the jar lid B. A turning of the lid in a right hand direction when the holder is applied as indicated in the drawing will permit the tight association of the lid with the jar. However, upon the reversal of the position of the holder with respect to the jar, the same will effectively prevent slippage of the jar while removing the lid therefrom.

Even though I have herein shown and described the invention as consisting of certain detail structural elements it is nevertheless to be understood that some changes may be made therein without effecting the spirit and scope of the appended claim.

Having thus described the invention, what I claim as new and desire to secure by Letters Patent is:—

In a jar holder of the class described, a hand lever slotted at its inner end, the rear wall of the slot being inclined, a jar encircling strap secured at one end to the slotted end of the hand lever, the free end of the strap adapted to pass through the slot, a gripping lever pivotally supported at its inner end within the slot of the hand lever adjacent the inclined rear wall of the slot, inwardly directed gripping teeth formed on the pivotal end of the gripping lever for binding the strap against the inclined rear wall of the slot to securely grip the jar when the free end of the gripping lever is swung inwardly toward the hand lever.

In testimony whereof I affix my signature.

JOSEPH B. RICHARD.